United States Patent [19]

Nakata et al.

[11] Patent Number: 5,184,197
[45] Date of Patent: Feb. 2, 1993

[54] METHOD FOR INSPECTING MAGNETIC DISK CARTRIDGE

[75] Inventors: Tomohiro Nakata; Akira Mizuta, both of Kanagawa, Japan

[73] Assignee: Fuji Photo Film Co., Ltd., Kanagawa, Japan

[21] Appl. No.: 814,793

[22] Filed: Dec. 31, 1991

[30] Foreign Application Priority Data

Jan. 10, 1991 [JP] Japan .................... 3-001540

[51] Int. Cl.$^5$ ..................... G01N 21/88; G01B 11/28
[52] U.S. Cl. .................................. 356/426; 250/561; 356/237; 356/379
[58] Field of Search ............... 356/426, 430, 379, 381, 356/237; 250/572, 561

[56] References Cited

U.S. PATENT DOCUMENTS

| 4,676,648 | 6/1987 | Schulz et al. | 356/426 X |
| 5,073,951 | 12/1991 | Hayashi | 356/237 X |

FOREIGN PATENT DOCUMENTS 63-205867 8/1988 Japan .
1-212635 8/1989 Japan .

Primary Examiner—Vincent P. McGraw
Attorney, Agent, or Firm—Sughrue, Mion, Zinn, Macpeak & Seas

[57] ABSTRACT

In a method for inspecting a magnetic disk cartridge, the state, with which an adhesive agent has been applied as an annular layer onto a flange of a center hub in order to adhere a magnetic disk body and the flange of the center hub to each other, is inspected. A collimated light beam is irradiated to a cross section of the layer of the adhesive agent, which cross section is taken in the radial direction of the center hub, from a direction which is parallel to the surface of the flange and which is perpendicular to the cross section of the layer of the adhesive agent. The collimated light beam has a beam diameter such that the whole cross section may be included in the beam diameter. The amount of the collimated light beam, which has passed through the region in the vicinity of the flange, is detected. The area of the cross section of the layer of the adhesive agent is calculated from the detected amount of the collimated light beam, which has passed through the region in the vicinity of the flange. Thereafter, the amount of the adhesive agent, which has been applied onto the flange, is investigated from the results of the calculation.

5 Claims, 2 Drawing Sheets

METHOD FOR INSPECTING MAGNETIC DISK CARTRIDGE

BACKGROUND OF THE INVENTION

1. Field of the Invention

This invention relates to a method for inspecting a magnetic disk cartridge composed of a cartridge and a magnetic disk housed in the cartridge, which magnetic disk is constituted of a center hub and a magnetic disk body adhered onto the center hub with an adhesive agent. This invention particularly relates to a method for inspecting a magnetic disk cartridge, wherein a judgment is made as to whether the state, with which an adhesive agent has onto a flange of a center hub for constituting a magnetic disk cartridge, is good or bad.

2. Description of the Prior Art

With rapid advances made in office automation apparatuses, or the like, and in magnetic disks serving as recording media, 3.5-inch type of or other types of magnetic disk cartridges are currently used most popularly. The magnetic disk cartridge is composed of a flexible, doughnut-shaped magnetic disk body, a hat-shaped center hub adhered to a center part of the magnetic disk body, and a hard case for housing the magnetic disk body and the center hub therein.

The accuracy, with which signals are recorded and reproduced with a magnetic disk cartridge, largely depends on whether the adhesive agent has been or has not been applied uniformly and as an annular layer onto the flange of the center hub and whether the center hub and the magnetic disk body have been accurately adhered to each other with the adhesive agent. Therefore, during the processes for manufacturing a magnetic disk cartridge, it is necessary for an inspection to be made as to whether the state, with which the adhesive agent has been applied onto the flange of the center hub for constituting the magnetic disk cartridge, is good or bad.

A technique for inspecting the state, with which an adhesive agent has been applied onto a flange of a center hub for constituting a magnetic disk cartridge, has been disclosed in, for example, Japanese Unexamined Patent Publication No. 63(1988)-205867. With the disclosed technique, a light beam (including ultraviolet light) is irradiated to a layer of an adhesive agent, which has been applied onto a flange of a center hub for constituting a magnetic disk cartridge. A light beam receiving device is located at a position that is capable of receiving the light beam, which has been reflected from the layer of the adhesive agent. The center hub is mechanically moved with respect to the light beam receiving device. In this manner, optical information representing the state, with which the adhesive agent has been applied onto the flange of the center hub for constituting a magnetic disk cartridge, is detected photoelectrically, and an electric signal representing the optical information is thereby obtained. From the level of the electric signal, a judgment is made as to whether the state, with which the adhesive agent has been applied onto the flange of the center hub for constituting a magnetic disk cartridge, is good or bad.

A different technique for inspecting the state, with which an adhesive agent has been applied onto a flange of a center hub for constituting a magnetic disk cartridge, has been disclosed in, for example, Japanese Unexamined Patent Publication No. 1(1989)-212635. With the disclosed technique, a light beam is irradiated to the whole surface of a layer of an adhesive agent, which has been applied onto a flange of a center hub for constituting a magnetic disk cartridge, and to the regions inward and outward from the layer of the adhesive agent. The light beam, which has been reflected from the whole surface of the layer of the adhesive agent and the regions inward and outward from the layer of the adhesive agent, is photoelectrically detected, and an electric signal is thereby obtained. Thereafter, operation processing is carried out on the electric signal, and a connectivity analysis is carried out. In cases where the connective components are three, it is judged that the state, with which the adhesive agent has been applied onto the flange of the center hub for constituting a magnetic disk cartridge, is good. In cases where the connective components are not three, it is judged that the state, with which the adhesive agent has been applied onto the flange of the center hub for constituting a magnetic disk cartridge, is bad.

With the conventional techniques described above, a judgment can be made only as to whether the state, with which the adhesive agent has been applied onto the flange of the center hub for constituting a magnetic disk cartridge, is good or bad, such as the presence or absence of a break in the layer of the adhesive agent, the presence or absence of protrusions of the adhesive agent from the normal position, to which the adhesive agent is to be applied, or the presence or absence of air bubbles in the layer of the adhesive agent. However, with the conventional techniques described above, inspections cannot be made as to how thick the layer of the adhesive agent is, i.e. how much the adhesive agent has been applied onto the flange of the center hub for constituting a magnetic disk cartridge.

SUMMARY OF THE INVENTION

The primary object of the present invention is to provide a method for inspecting a magnetic disk cartridge, wherein an inspection can be made as to the amount of an adhesive agent, which has been applied onto a flange of a center hub for constituting a magnetic disk cartridge.

Another object of the present invention is to provide a method for inspecting a magnetic disk cartridge, wherein inspections can be made as to the amount of an adhesive agent, which has been applied onto a flange of a center hub for constituting a magnetic disk cartridge, the presence or absence of a break in the layer of the adhesive agent, the presence or absence of protrusions of the adhesive agent from the normal position, to which the adhesive agent is to be applied, and the presence or absence of air bubbles in the layer of the adhesive agent.

The present invention provides a first method for inspecting a magnetic disk cartridge, wherein the state, with which an adhesive agent has been applied as an annular layer onto a flange of a center hub in order to adhere a magnetic disk body and the flange of the center hub to each other, is inspected, the method for inspecting a magnetic disk cartridge comprising the steps of:

i) irradiating a collimated light beam to a cross section of the layer of said adhesive agent, which cross section is taken in the radial direction of said center hub, from a direction which is parallel to the surface of said flange and which is perpendicular to said cross section of the layer of said adhesive agent, said collimated light beam having a beam diameter such that the whole cross section may be included in the beam diameter, ii) detecting the amount of the collimated light beam, which has passed through the region in the vicinity of said flange, iii) calculating the area of said cross section of the layer of said adhesive agent from the detected amount of the collimated light beam, which has passed through the region in the vicinity of said flange, and iv) inspecting the amount of said adhesive agent, which has been applied onto said flange, from the results of the calculation.

The present invention also provides a second method for inspecting a magnetic disk cartridge, which comprises the steps of, in addition to the steps of the first method for inspecting a magnetic disk cartridge in accordance with the present invention:

a) irradiating light beams to the layer of said adhesive agent and to a part inward from a normal position, to which said adhesive agent is to be applied, or a part outward from said normal position, b) detecting the intensity of light having specific wavelengths in the light beams, which have been reflected from the layer of said adhesive agent and from said part inward from said normal position or said part outward from said normal position, and c) inspecting the state, with which said adhesive agent has been applied onto said flange, from the results of the detection of the intensity of light having specific wavelengths.

With the first method for inspecting a magnetic disk cartridge in accordance with the present invention, the collimated light beam is irradiated to the cross section of the layer of the adhesive agent, which cross sectin is taken in the radial direction of the center hub, from the direction which is parallel to the surface of the flange and which is perpendicular to the cross section of the layer of the adhesive agent. The amount of the collimated light beam, which has passed through the region in the vicinity of the flange, is detected. Thereafter, the area of the cross section of the layer of the adhesive agent is calculated from the detected amount of the collimated light beam, which has passed through the region in the vicinity of the flange. When the collimated light beam is irradiated to the cross section of the layer of the adhesive agent form the direction, which is parallel to the surface of the flange and which is perpendicular to the cross section of the layer of the adhesive agent, the part of the collimated light beam, which part has passed through the layer of the adhesive agent, becomes darker than the other parts of the collimated light beam. In particular, in ases where the adhesive agent is colored in black, or the like, and is thus opaque, part of the collimated light beam is blocked by the adhesive agent and is irradiated as a shadow onto a light beam receiving surface of a light beam receiving means. The shadow approximately corresponds to the cross section of the layer of the adhesive agent, which cross section is taken in the radial direction of the center hub. Therefore, by detecting the amount of the collimated light beam, which has passed through the region in the vicinity of the flange, the area of the cross section of the layer of the adhesive agent can be investigated. In this manner, the amount of the adhesive agent, which has been applied onto the flange, can be investigated easily.

With the second method for inspecting a magnetic disk cartridge in accordance with the present invention, the amount of the adhesive agent, which has been applied onto the flange, can be investigated in the same manner as the first method for inspecting a magnetic disk cartridge in accordance with the present invention. Also, the intensity of light having specific wavelengths in the light beams, which have been reflected from the layer of the adhesive agent and from the part inward from the normal position, to which the adhesive agent is to be applied, or the part outward from the normal position is detected. From the results of the detection of the intensity of light having specific wavelengths, inspections can be made as to coating defects, such as a break in the layer of the adhesive agent, protrusions of the adhesive agent from the normal position, to which the adhesive agent is to be applied, and air bubbles in the layer of the adhesive agent. Accordingly, overall inspection concerning the application of the adhesive agent can be carried out.

DESCRIPTION OF THE PREFERRED EMBODIMENTS

The present invention will hereinbelow be described in further detail with reference to the accompanying drawings.

Figure 1:
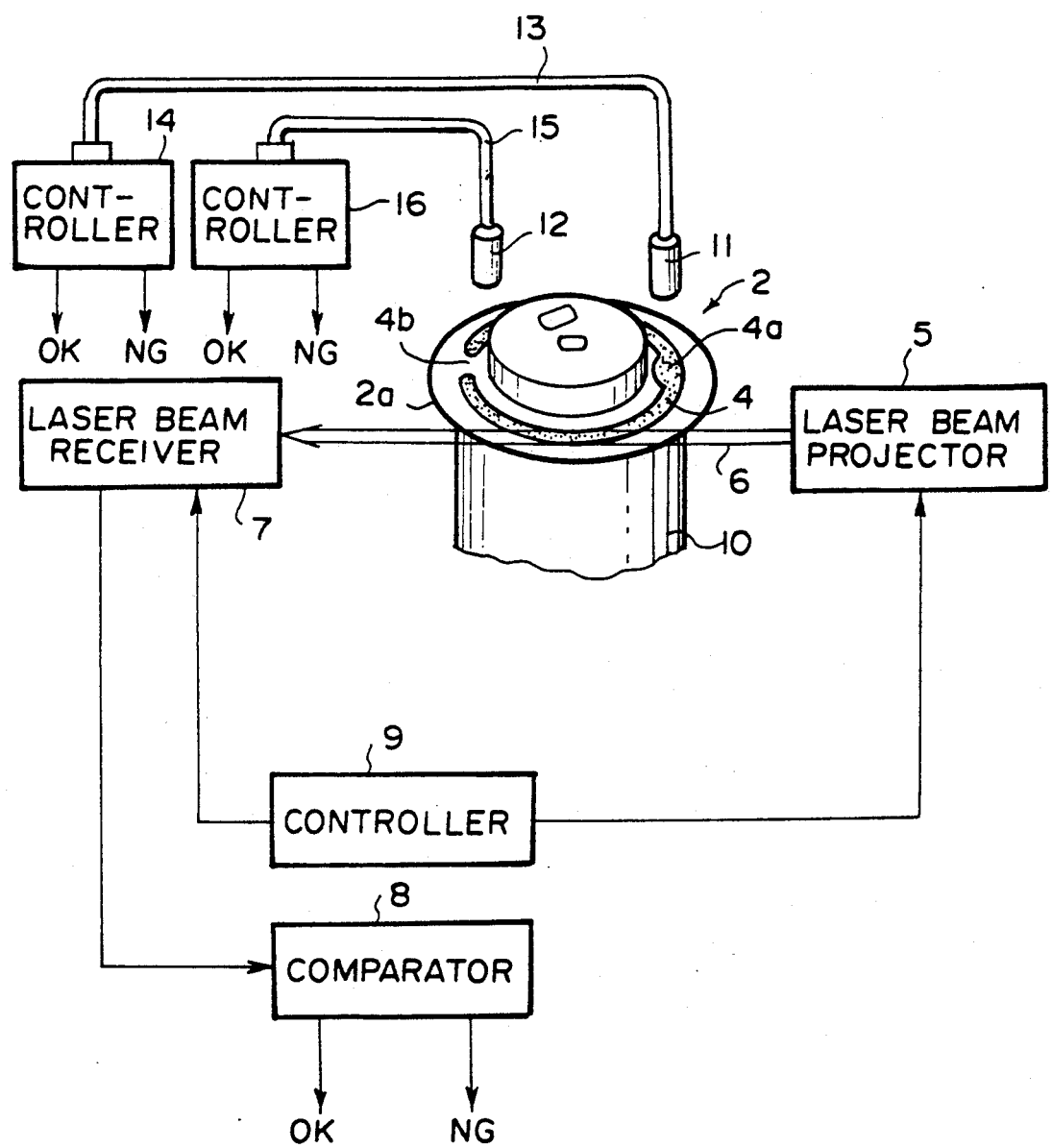
FIG. 1 is a schematic view showing an example of an apparatus for carrying out an embodiment of the method for insepcting a magnetid disk cartridge in accordance with the present invention.

FIG. 1 is a schematic view showing an example of an apparatus for carrying out an embodiment of the method for inspecting a magnetic disk cartridge in accordance with the present invention. A magnetic disk body and a center hub 2, which constitute a magnetic disk cartridge, are adhered to each other with a black adhesive agent 4, which is applied onto a flange 2a of the center hub 2. In this embodiment, from a change in the amount of reflected light beam, which will be described later, an inspection is made as to whether or not a predetermined amount of the black dhesive agent 4 has been applied uniformly to the whole circumference of the flange 2a.

The apparatus shown in FIG. 1 is composed of a coating amount detecting section and a coating defect detecting section.

The coating amount detecting section is provided with a laser beam projector 5, which produces a laser beam 6. The laser beam 6 is irradiated to a cross section of an annular layer of the adhesive agent 4 having been applied onto the flange 2a of the center hub 2, which cross section is taken in the radial direction of the center hub 2. The laser beam 6 is irradiated to the cross section of the annular layer of the adhesive agent 4 from a direction, which is parallel to the surface of the flange 2a and which is perpendicular to the cross section of the layer of the adhesive agent 4. The coating amount detecting section is also provided with a laser beam receiver 7, which receives the laser beam 6, which has passed through the layer of the adhesive agent 4. The coating amount detecting section is additionally provided with a comparator 8, which receives a level signal proportional to the amount of the laser beam 6 detected by the laser beam receiver 7, which compares the level of the level signal and a reference level signal with each other, and which feeds out an OK signal or an NG signal in accordance with the results of the comparison. The coating amount detecting section is further provided with a controller 9, which controls the laser beam projector 5 and the laser beam receiver 7.

The coating defect detecting section detects whether or not the adhesive agent 4 has been accurately applied to a predetermined position. The coating defect detecting section is provided with a first color mark sensor 11, which detects a protrusion 4a of the adhesive agent 4 from the predetermined position, to which the adhesive agent 4 is to be applied. The coating defect detecting section is also provided with a second color mark sensor 12, which detects a break 4b or air bubbles in the layer of the adhesive agent 4. The coating defect detecting section is additionally provided with cables 13 and 15, through which an electric power is fed into the first color mark sensor 11 and the second color mark sensor 12 and through which signals representing the amounts of light detected by the first color mark sensor 11 and the second color mark sensor 12 are transmitted. The coating defect detecting section is further provided with controllers 14 and 16, which apply an electric power to the cables 13 and 15, which receive the signals from the cables 13 and 15, and which compare the values of the signals received from the cables 13 and 15 and reference values with each other and feed out an OK signal or an NG signal.

The center hub 2 is placed on a rotatable table 10. In this state, the rotatable table 10 is coupled by a nest clutch, or the like, with a rotating means, such as a pulse motor. As the rotating means operates, the rotatable table 10 rotates such that inspections may be made over the whole circumference of the region, to which the adhesive agent 4 has been applied.

How the embodiment of the method for inspecting a magnetic disk cartridge in accordance with the present invention is carried out with the apparatus of FIG. 1 will be described hereinbelow.

The laser beam 6, which has been produced by the laser beam projector 5, is irradiated to the layer of the adhesive agent 4, which has been applied onto the flange 2a of the center hub 2. Position adjustments are carried out such that the laser beam 6 may be irradiated to a cross section of the layer of the adhesive agent 4, which cross section is taken in the radial direction of the center hub 2, from a direction, which is approximately perpendicular to the cross section of the layer of the adhesive agent 4. The beam diameter of the laser beam 6 is approximately 20 mm such that it completely includes the cross section of the layer of the adhesive agent 4.

Figure 2:
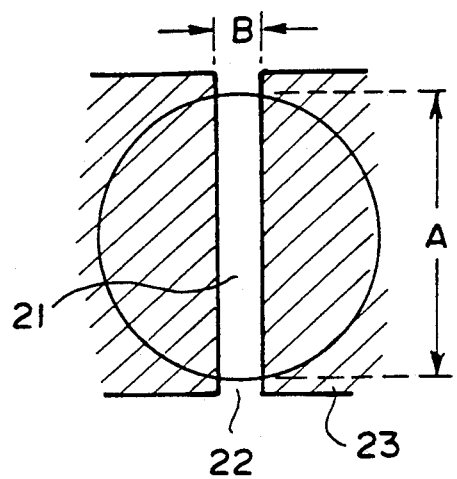
FIG. 2 is an explanatory view showing a front surface of a light beam receiver in the apparatus of FIG. 1.

As illustrated in FIG. 2, a light blocking plate 23, which has a narrow slit 22, is located in front of a light beam receiving surface of the laser beam receiver 7. The slit 22 is located such that an image of the cross section of the layer of the adhesive agent 4 may be formed at the slit 22 by the laser beam 6.

The diameter A of the beam spot of the laser beam 6, which beam spot is formed on the light beam receiving surface of the laser beam receiver 7, is approximately 10 mm. The width B of the slit 22 is approximately 1 mm.

Figure 3:
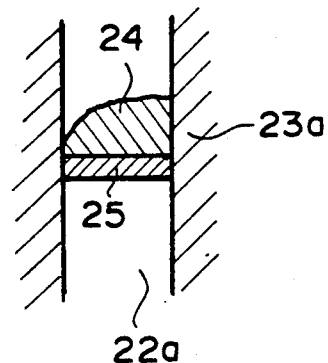
FIG. 3 is an explanatory view showing an image of a layer of an adhesive agent, which image is projected onto the light beam receiver in the apparatus of FIG. 1.

In this state, the rotatable table 10 is rotated, and the laser beam 6, which has passed through the layer of the adhesive agent 4, is irradiated onto the laser beam receiver 7. FIG. 3 is an enlarged view showing the image formed on the light receiving surface of the laser beam receiver 7. As illustrated in FIG. 3, an image 25 of the center hub 2 and an image 24 of the cross section of the layer of the adhesive agent 4 are projected onto the light beam receiving surface of the laser beam receiver 7. The amount of the laser beam 6 at the parts corresponding to the images 24 and 25 is smaller than the amount of the laser beam 6 at the other parts. Therefore, by detecting the amount of the laser beam 6 received by the laser beam receiver 7, the sizes of the images 24 and 25 can be calculated.

At a part 32a at which the laser beam 6 has been blocked by the light blocking plate 23, the amount of the laser beam 6 received is approximately zero. When the light blocking plate 23 is thus located, the amount of the laser beam 6 received by the laser beam receiver 7 is caused to change only by a change in the area of the part corresponding to the cross section of the layer of the adhesive agent 4.

The laser beam receiver 7 generates a level signal corresponding to the amount of the laser beam 6 received. The level signal is fed into the comparator 8.

Figure 4:
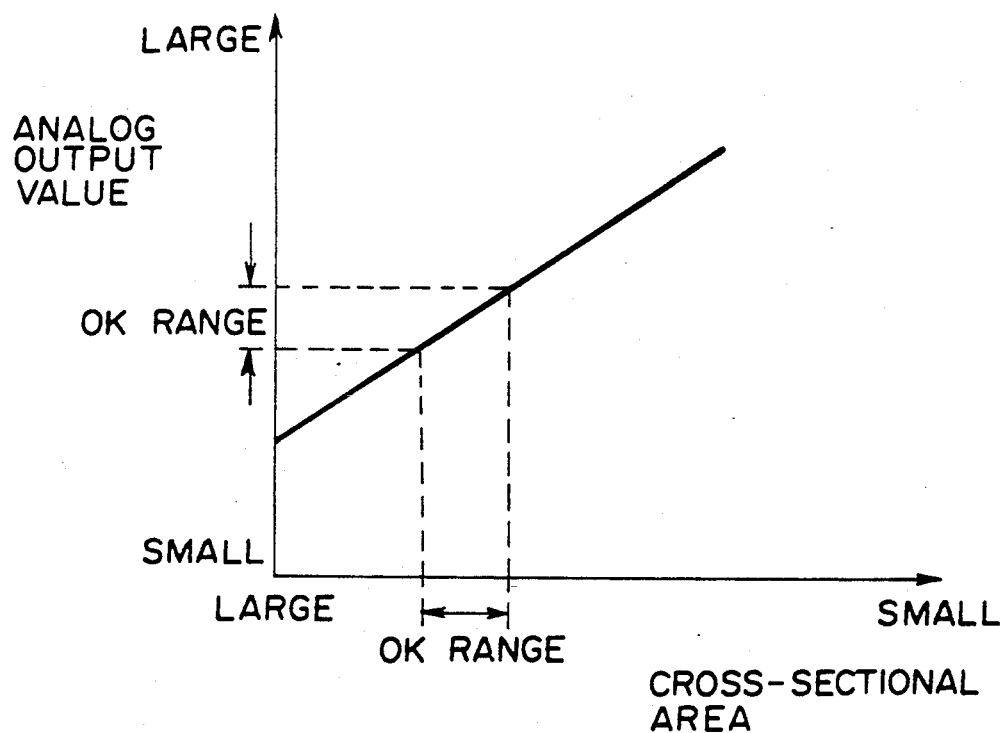
FIG. 4 is a graph showing a normal range, which is a judgment criteria of a comparator in the apparatus of FIG. 1.

In the comparator 8, an upper limit value and a lower limit value of a normal range of the level signal are set, which limit values have been calculated from a normal range of the amount of the adhesive agent 4 applied onto the flange 2a. In cases where the level of the received level signal falls within the range of the lower limit value to the upper limit value, the comparator 8 feeds out an OK signal. In cases where the level of the received level signal does not fall within this range, the comparator 8 feeds out an NG signal. FIG. 4 shows the relationship between the cross-sectional area of the adhesive agent 4 and the level of the analog level signal.

The OK signal and the NG signal may be fed into pilot lamps such that an operator can visually investigate whether the amount of the adhesive agent 4, which has been applied onto the flange 2a, is or is not correct. Alternatively, the OK signal and the NG signal may be fed into a controller of an automatic sorting apparatus for sorting center hubs 2, 2, ... in an assembly line such that center hubs 2, 2, ... may be sorted into non-defective or defective ones in accordance with the OK signal and the NG signal.

The inspection about coating defects is carried out simultaneously with the inspection about the amount of the adhesive agent 4, which has been applied onto the flange 2a. Specifically, the first color mark sensor 11 for inspecting a protrusion 4a of the adhesive agent 4 from the predetermined position, to which the adhesive agent 4 is to be applied, is located such that it may irradiate a collimated light beam to a part inward from the normal position, to which the adhesive agent 4 is to be applied, and may receive the light beam, which has been reflected from the part inward from the normal position. The second color mark sensor 12, which detects a break 4b or air bubbles in the layer of the adhesive agent 4, is located such that it may irradiate a collimated light beam to the normal position, to which the adhesive agent 4 is to be applied, and may receive the light beam, which has been reflected from the normal position.

The first color mark sensor 11 and the second color mark sensor 12 are constituted of reflection types of optical sensors, which detect a light beam having wavelengths falling within a specific range, i.e. a light beam having wavelengths capable of being easily absorbed by the adhesive agent 4. The adhesive agent 4 has been colored, and the intensity of the light beam, which has wavelengths falling within the specific range and which has been reflected by the adhesive agent 4, is very low. When the light beam impinges upon a part, at which the adhesive agent 4 is not present, such as a break or an air bubble in the layer of the adhesive agent 4, the light beam is totally reflected from the center hub 2. Therefore, the intensity of the light beam having been reflected from the part, at which the adhesive agent 4 is not present, is high. In this manner, the intensity of the reflected light beam clearly differs between when the light beam impinges upon a part, at which the adhesive agent 4 is present, and when the light beam impinges upon a part, at which the adhesive agent 4 is not present. Accordingly, defects in the layer of the adhesive agent 4 can be investigated from a change in the amounts of light received by the first color mark sensor 11 and the second color mark sensor 12.

The detection signals, which are generated by the first color mark sensor 11 and the second color mark sensor 12 and whose levels correspond to the amounts of light detected, are fed into controllers 14 and 16.

In each of the controllers 14 and 16, an upper limit value and a lower limit value of a normal range of the detection signal are set which limit values have been calculated from a normal state of the layer of the adhesive agent 4 applied onto the flange 2a. In cases where the level of the received detection signal falls within the range of the lower limit value to the upper limit value, each of the controllers 14 and 16 feeds out an OK signal. In cases where the level of the received detection signal does not fall within this range, each of the controllers 14 and 16 feeds out an NG signal.

As in the OK signal and the NG signal in the aforesaid inspection of the amount of the adhesive agent 4 applied onto the flange 2a, the OK signals and the NG signals fed out from the controllers 14 and 16 are used to turn on or off the corresponding pilot lamps or used as judgment signals in the automatic sorting operations.

In the embodiment described above, the first color mark sensor 11 is employed to inspect the part inward from the normal position, to which the adhesive agent 4 is to be applied. In lieu of or as a supplement to the inspection of the part inward from the normal position, the part outward from the normal position may be inspected in the same manner.

The inspections described above are carried out continuously or intermittently while the rotatable table 10 rotates one turn or several turns.

The method for inspecting a magnetic disk cartridge in accordance with the present invention may be embodied in various other manners. Also, with the method for inspecting a magnetic disk cartridge in accordance with the present invention, only the amount of the adhesive agent 4 applied onto the flange 2a may be inspected.

What is claimed is:

1. A method for inspecting a magnetio disk cartridge, wherein the state, with which an adhesive agent has been applied as an annular layer onto a flange of a center hub in order to adhere a magnetic disk body and the flange of the center hub to each other, is inspected, the method for inspecting a magnetic disk cartridge comprising the steps of:
    i) irradiating a collimated light beam to a cross section of the layer of said adhesive agent, which cross section is taken in the radial direction of said center hub, from a direction which is parallel to the surface of said flange and which is perpendicular to said cross section of the layer of said adhesive agent, said collimated light beam having a beam diameter such that the whole cross section may be included in the beam diameter,
    ii) detecting the amount of the collimated light beam, which has passed through the region in the vicinity of said flange,
    iii) calculating the area of said cross section of the layer of said adhesive agent from the detected amount of the collimated light beam, which has passed through the region in the vicinity of said flange, and
    iv) inspecting the amount of said adhesive agent, which has been applied onto said flange, from the results of the calculation.

2. A method as defined in claim 1 further comprising the steps of:
    a) irradiating light beams to the layer of said adhesive agent and to a part inward from a normal position, to which said adhesive agent is to be applied, or a part outward from said normal position,
    b) detecting the intensity of light having specific wavelengths in the light beams, which have been reflected from the layer of said adhesive agent and from said part inward from said normal position or said part outward from said normal position, and
    c) inspecting the state, with which said adhesive agent has been applied onto said flange, from the results of the detection of the intensity of light having specific wavelengths.

3. A method as defined in claim 1 wherein the amount of the collimated light beam, which has passed through the region in the vicinity of said flange, is detected via a light blocking plate having a narrow slit.

4. A method as defined in claim 1 wherein said adhesive agent is a black adhesive agent.

5. A method as defined in claim 1 wherein said collimated light beam is a laser beam.

* * * * *